Patented July 20, 1943

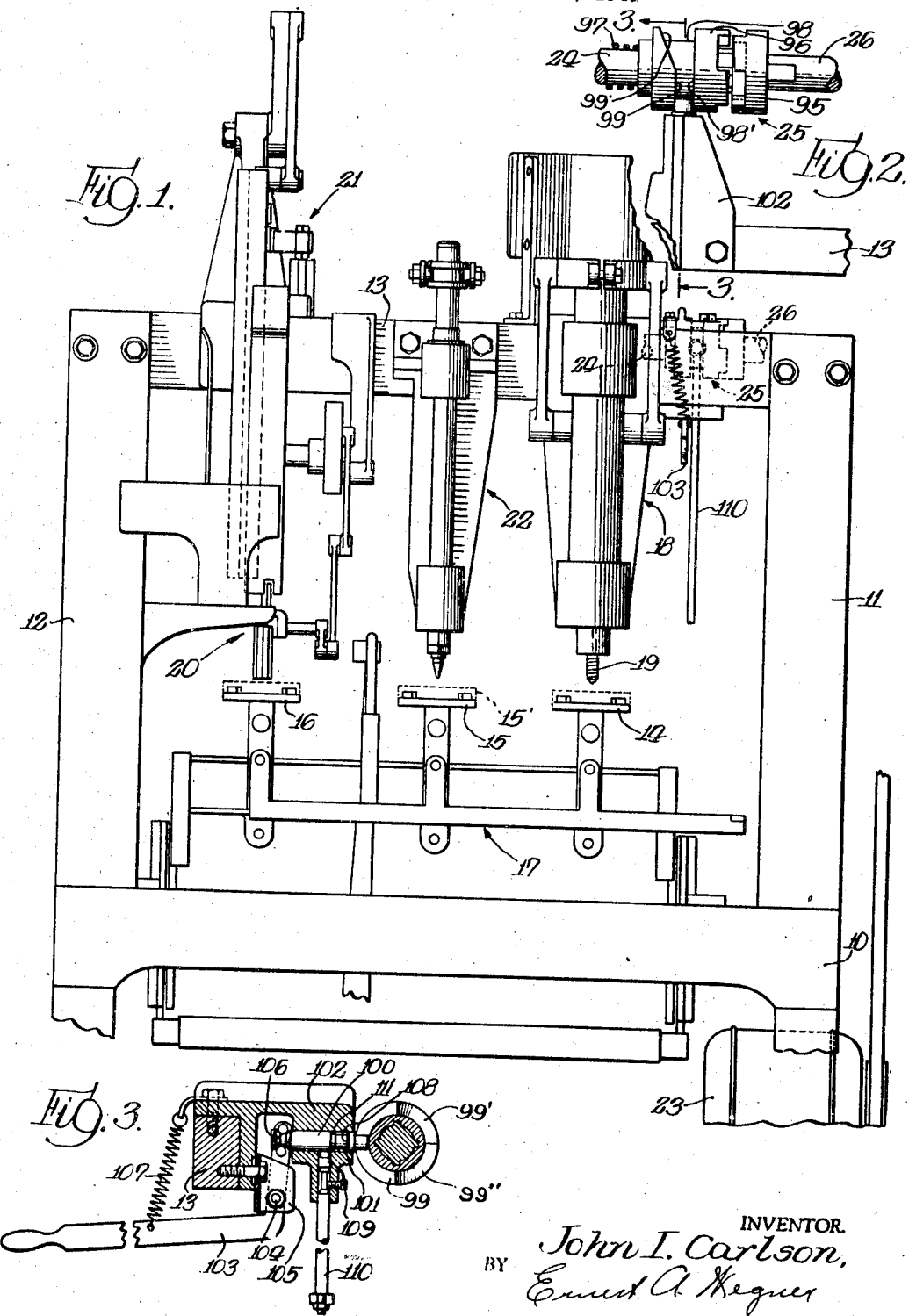

2,324,482

UNITED STATES PATENT OFFICE 2,324,482

CLUTCH THROWOUT MECHANISM

John I. Carlson, Aurora, Ill., assignor to Carlson Tool & Machine Co., Aurora, Ill., a partnership composed of John I. Carlson and Clifford D. Carlson Original application June 5, 1940, Serial No. 338,859. Divided and this application February 20, 1941, Serial No. 379,808

6 Claims. (Cl. 192—33)

The invention relates generally to a throw-out mechanism for a clutch and particularly to such mechanism especially adapted for use in a brush making machine.

One object of the invention is to provide a clutch throw-out mechanism of new and improved construction, capable of disengaging a rapidly rotating clutch without shock to the throw-out mechanism.

Another object is to provide, in a machine having a governing element of slow and small movement, clutch throw-out mechanism governed by the element including means releasable by the governing element and cooperable with means on the clutch to effect disengagement of the clutch without shock to the throw-out mechanism.

A further object is to provide a clutch throw-out mechanism having a main pin manually withdrawable against spring tension to an inoperative position and a second pin cooperable with the first pin and serving as the means for latching the same in inoperative position.

Other objects and advantages will become apparent from the following description, taken in connection with the accompanying drawing, in which:

Fig. 1 is a front elevational view of the top portion of a brush making machine having a clutch throw-out mechanism embodying the features of the invention.

Fig. 2 is a fragmentary and enlarged top plan view showing the clutch and clutch throw-out mechanism.

Fig. 3 is a sectional view taken along the line 3—3 of Fig. 2.

While the invention is herein shown and will hereinafter be described in a preferred embodiment, it is not intended that the invention is to be limited thereby to the specific construction disclosed, but on the contrary it is intended to cover all modifications and alternative constructions falling within the spirit and scope of the invention as defined by the appended claims.

This application is a division of my copending application for Brush making machine, Serial No. 338,859, filed June 5, 1940.

Though the clutch throw-out mechanism hereinafter disclosed is adaptable for use in a variety of machines, it is particularly well adapted for use in a brush making machine. It will accordingly be disclosed in such an environment for exemplary purposes. The brush making machine, shown particularly in Fig. 1 for purposes of disclosure, is of the general type of brush making machine well known in the art. Generally such a machine comprises a bed or base 10 from which rise two upright frame members 11 and 12 connected at their upper free ends by a cross member 13. Disposed above the bed 10 are a plurality of tables or supports 14, 15 and 16. These tables are mounted upon and actuated by suitable mechanism, herein designated 17, which is operable to move the tables both transversely and longitudinally of the machine in an intermittent step by step movement corresponding to the spacing of the tufting of the brush, as well as to tilt the tables to permit certain of the tufts to be placed at an angle to obtain the desired flare of the brush.

The table 14 is adapted to carry a blank wooden block shaped to form the brush back. Mounted on the cross member 13 above the table 14 for action on the brush back carried by the table is a drill head 18. This drill head is reciprocated and the drill 19 carried thereby continuously rotated so as to bore holes in the block carried by the table 14, in conformity with a predetermined pattern. The table 16 is adapted to support a brush back which has been formed with the necessary tuft receiving holes and disposed thereabove for cooperation therewith is a tuft supplying mechanism 20 and a staple forming and driving mechanism 21. Like the drill head 18, the mechanisms 20 and 21 are intermittently operated in order intermittently to secure tufts in holes of the brush back at the same time that corresponding holes are being drilled in a blank brush back carried on the table 14.

The third table 15 is adapted to carry a template 15' having holes therein corresponding to the desired pattern that the brush is to have. Cooperating with this template is a hole finder 22 which is also mounted on the cross member 13 and reciprocated in timed relation with the reciprocation of the drill head and staple driving mechanism to assure that the tables 14, 15 and 16, which are all interconnected, are accurately positioned.

Inasmuch as the various cams, eccentrics and like mechanism, for imparting to the table actuating and supporting mechanisms 17, the drill head, the tuft supplying and staple driving mechanisms 20 and 21, and the hole finder 22 their intermittent and interrelated and timed movements, are of more or less conventional construction and form no part of this invention, the same have not been disclosed herein. Suffice it to say, therefore, that the various mechanisms are driven preferably from an electric motor 23 through such cams and like mechanism mounted on a main cam shaft 24, coupled through the medium of a clutch 25 with a drive shaft 26, and also usually mounted on an auxiliary shaft (not shown) which is driven at a low R. P. M.

In brush making machines of the type disclosed the machine is usually started and stopped through the medium of the clutch 25 and, moreover, the machine is started and stopped with each brush. Starting of the machine is effected manually after a drilled brush back has been mounted on the table 16 and a blank brush back mounted on the table 14. Stopping of the machine is normally effected automatically after the last hole has been drilled in one brush back and the last tuft inserted in the other brush back, and it is necessary, therefore, that the machine be stopped quickly and precisely before the drill head 18 and the staple driving mechanism 21 begin another downward stroke. Such automatic stopping of the machine is normally under the control of a member which is given a small step by step movement with each operation of the reciprocating elements. With such limited movement of the control member, and with the necessity that the machine be stopped quickly and precisely, the normal lever type of throwout mechanism is not suitable, but the circumstances require a throw-out mechanism which suddenly engages one of the clutch elements and by such engagement disconnects the clutch. Inasmuch as in certain machines the shaft 24 may be revolving at a rate as high as 360 R. P. M., there is a tremendous shock at the time of such engagement of the mechanism with the clutch element. While it has been possible to make the clutch of such construction yet to withstand this shock, great difficulty has been experienced in the past in providing a clutch throw-out mechanism capable of withstanding the shock.

It is a feature of this invention to provide improved clutch throw-out mechanism in which there is no shock to the mechanism. The clutch disclosed herein is of the jaw type having one element 95 fixed on the drive shaft 26 and a complementary element 96 splined on the shaft 24. The latter element 96 is normally and constantly urged toward engagement with the element 95 by a spring 97. Formed in the clutch element 96 and constituting a part of the throwout mechanism is a peripheral cam groove 98 with one side wall 98' which is straight, while the opposite side wall has a straight and parallel portion 99 extending over approximately 180°, a portion 99' extending over approximately 90° which is disposed at an angle to the plane of the straight portions of the side walls and flares outwardly, and a complementary angle portion 99''.

Adapted to cooperate with the cam groove 98 in the element 96 is a pin 100 which is slidably supported in a bore 101 formed in a bracket 102 bolted to the cross member 13. The pin 100 has two positions, namely, a withdrawn position in which it is out of engagement with the element 96, and a projected position, shown in Figs. 2 and 3, in which it engages in the cam groove 98. The pin 100 is so positioned longitudinally of the shaft 24 that when it is in engagement with the narrow portion of the cam groove 98 the clutch will be disengaged. It is understood, of course, that the clutch is rotated in a clockwise direction, as viewed in Fig. 3, so that when the pin 100 is first shifted to its extended position it will engage the inclined portion 99' of the cam groove so that the element 96 will be gradually disengaged as the inclined portion 99' travels past the pin 100. Inasmuch as the angle of the inclined portion 99' with respect to the transverse plane through the cam groove is small, disengagement of the clutch is effected with little shock to the pin 100. The clutch element 96, being the driven element, will upon being disengaged from the element 95 come to rest while the pin 100 is in the narrow portion of the cam groove and thus will be retained in disengaged position until the pin is withdrawn.

The pin 100 is controlled through the medium of a hand operated lever 103 which is pivoted at 104 to a bracket 105 and at its inner end engages a groove 106 formed on the end of the pin 100 for that purpose. The lever 103 is normally urged in a direction to cause extension of the pin 100 by a tension spring 107 connected at one end to the lever 103 and at the other end to the bracket 102. To retain the pin in its withdrawn position, the same is formed with a groove 108 adapted to be engaged by a locking plunger 109 formed on the end of a rod 110 which, as best seen in Fig. 1, extends downwardly to a point adjacent the mechanism 17 for actuation when a brush is completed. Normally, the pin 100 is withdrawn through manual operation of the lever 103 by the operator of the machine when it is desired to initiate operation of the machine, the pin being retained in its withdrawn position, as above stated, by the locking plunger 109. Upon completion of the brush, the plunger 109 is automatically withdrawn to permit the pin 100 to be moved to its projected position under the influence of the spring 107 so that the clutch will immediately be disengaged and the machine stopped. Preferably, the pin 100 is formed with a slightly reduced portion 111 intermediate the grove 108 and the body of the pin, in order that any burs that may be struck up as a result of the action of the locking plunger 109 on the pin will not become wedged between the pin and the bore 101.

I claim as my invention:

1. A throw-out mechanism for a clutch comprising, in combination, an axially shiftable pin having a projected and a withdrawn position, a locking groove formed in said pin, a lever engaging said pin operable to shift the same to either its retracted or its projected position, a spring engaging said lever normally urging the same to shift the pin to projected position, and a locking bolt operable to engage the locking groove in said pin when in retracted position to hold the same retracted against the action of said spring.

2. A throw-out mechanism for a clutch comprising, in combination, a casting having a bore therein, a pin reciprocable in said bore to have an operative and an inoperative position, said pin having a locking groove formed therein and a reduced portion intermediate said groove and the main body of said pin, a lever pivotally mounted on said casting and at one end engaging said pin to shift the same to its various positions, a spring acting on said lever operable normally to urge said pin to its operative position, said casting having a second bore at right angles to the first mentioned bore, and a locking plunger reciprocable in said second bore operable to project into the groove in said pin when in inoperative position to lock the same in such position against the action of said spring.

3. A throw-out mechanism for a clutch having a shiftable clutch element comprising, in combination, a peripheral cam groove in the shiftable clutch element, one side wall of which has a portion disposed at an angle to the plane of said groove, an axially shiftable pin having a withdrawn position and a projected position engaging in said cam groove, a lever engaging said pin operable to shift the same to either its withdrawn or its projected position, a spring normally urging said pin to projected position, and means directly engaging said pin for locking the same in withdrawn position against the action of said spring and operable upon slight movement to release said pin to said spring for instantaneous projection.

4. In a throw-out mechanism for a clutch, an axially shiftable throw-out pin having an operative and an inoperative position, a spring urging said pin toward its operative position and a locking plunger for said pin disposed at right angles thereto, an annular groove in said pin with which said locking plunger engages to hold the pin in its inoperative position, and a reduced portion between said groove and the main body of said pin to provide clearance for burs that may be struck up by action of said pin on said locking plunger.

5. A throw-out mechanism for a clutch comprising, in combination, an axially shiftable, clutch element controlling pin having a projecting and a retracted position, locking means formed directly on said pin, a lever engaging said pin operable to shift the same to either its retracted or its projected position, a spring constantly urging said pin to projected position, and a locking bolt operable to engage the locking means on said pin when in retracted position to hold the same retracted against the action of said spring and withdrawable from the locking means to release said pin to said spring.

6. The combination of an axially shiftable driven clutch element having a peripheral cam groove, means urging said element toward engaged position, and a cooperating clutch throw-out mechanism comprising an axially shiftable pin having a retracted position and a projected position radially engaging in said cam groove, said pin in its projected position cooperating with said cam groove to shift said clutch element to disengaged position, a spring constantly urging said pin to projected position, a lever engaging said pin operable to shift the same to retracted position against the action of said spring, and means directly engaging said pin for holding the same in retracted position against the action of said spring and operable upon slight movement to release said pin to said spring for instantaneous projection into the cam groove in the clutch element.

JOHN I. CARLSON.